United States Patent
Bernzen et al.

(10) Patent No.: US 7,954,590 B2
(45) Date of Patent: Jun. 7, 2011

(54) METHOD FOR A PREVENTIVE-ACTION PROTECTION SYSTEM IN A MOTOR VEHICLE

(75) Inventors: Werner Bernzen, Ehningen (DE); Dominic Reutter, Notzingen (DE)

(73) Assignee: Daimler AG, Stuttgart (DE)

( * ) Notice: Subject to any disclaimer, the term of this patent is extended or adjusted under 35 U.S.C. 154(b) by 843 days.

(21) Appl. No.: 11/793,920

(22) PCT Filed: Nov. 22, 2005

(86) PCT No.: PCT/EP2005/012466
§ 371 (c)(1),
(2), (4) Date: Dec. 14, 2007

(87) PCT Pub. No.: WO2006/072283
PCT Pub. Date: Jul. 13, 2006

(65) Prior Publication Data
US 2008/0143177 A1 Jun. 19, 2008

(30) Foreign Application Priority Data
Dec. 24, 2004 (DE) .......................... 10 2004 062 486

(51) Int. Cl.
*B60R 21/0132* (2006.01)
*B60R 22/195* (2006.01)
*B60R 22/40* (2006.01)
*B60R 22/41* (2006.01)

(52) U.S. Cl. ........ 180/282; 280/806; 280/807; 297/478; 297/480

(58) Field of Classification Search ................. 280/806, 280/807; 297/478, 480; 180/275, 276, 282
See application file for complete search history.

(56) References Cited

U.S. PATENT DOCUMENTS

| 6,394,495 | B1 | 5/2002 | Specht |
| 7,178,622 | B2 | 2/2007 | Eberle et al. |
| 2006/0237960 | A1 | 10/2006 | Kudo et al. |

FOREIGN PATENT DOCUMENTS

| DE | 100 29 061 A1 | 1/2002 |
| DE | 101 21 386 C1 | 8/2002 |
| EP | 1 415 872 A1 | 5/2004 |
| EP | 1 593 561 A1 | 11/2005 |
| JP | 2001-114068 A | 4/2001 |
| JP | 2004-322690 A | 11/2004 |
| WO | WO 2004/065181 A1 | 8/2004 |

OTHER PUBLICATIONS

International Search Report dated Apr. 6, 2006 with an English translation of the pertinent portions including Form PCT/ISA/220 dated Oct. 2005 and Form PCT/ISA/237 dated Jan. 2004 (Thirteen (13) pages).

*Primary Examiner* — Faye M. Fleming
*Assistant Examiner* — Keith Frisby
(74) *Attorney, Agent, or Firm* — Crowell & Moring LLP

(57) ABSTRACT

In a method for operating a preventive-action protection system in a vehicle having safety devices for diminishing the consequences of accidents, driving state data is acquired by a driving state sensor system and is monitored with respect to the longitudinal deceleration of the vehicle and a braking torque request by the driver. A state of emergency braking is determined by a braking request evaluation means, and at least one of the safety devices is triggered only if a longitudinal deceleration below a longitudinal deceleration threshold is simultaneously present.

9 Claims, 1 Drawing Sheet

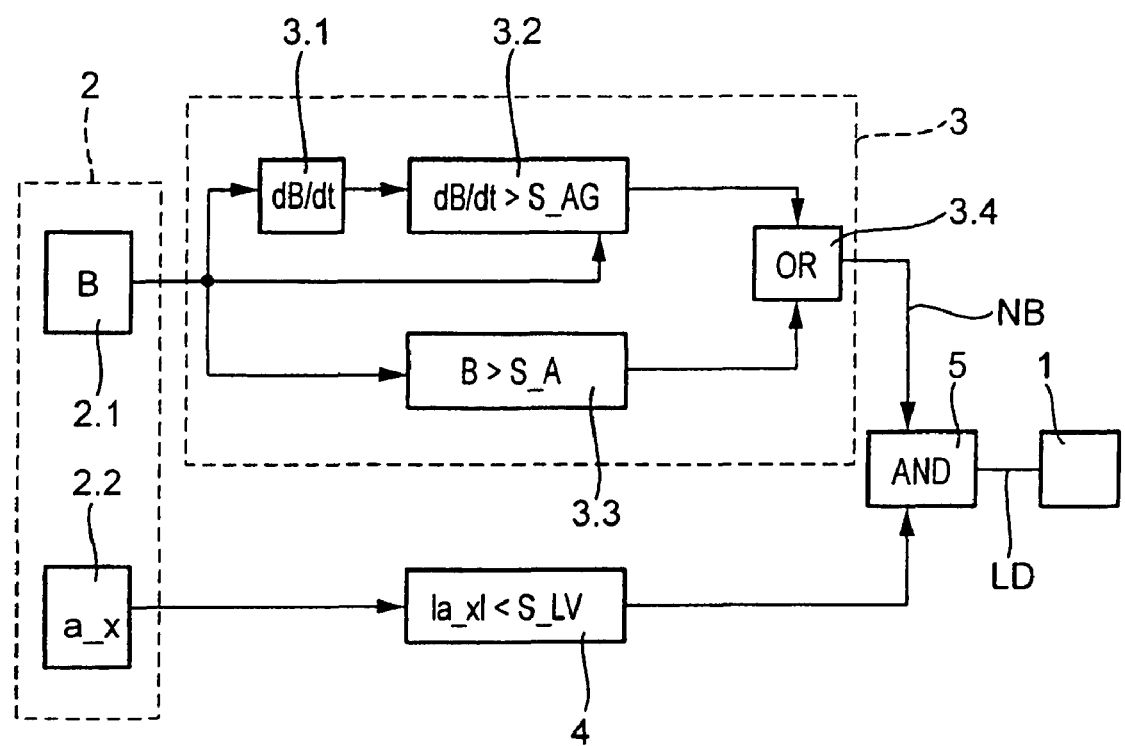

METHOD FOR A PREVENTIVE-ACTION PROTECTION SYSTEM IN A MOTOR VEHICLE

This application is a national stage of PCT International Application No. PCT/EP2005/012466, filed Nov. 22, 2005, which claims priority under 35 U.S.C. §119 to German Patent Application No. 10 2004 062 486.0, filed Dec. 24, 2004, the disclosure of which is expressly incorporated by reference herein.

BACKGROUND AND SUMMARY OF THE INVENTION

The invention relates to a method for operating a preventive-action protection system in a motor vehicle which has safety devices for mitigating the consequences of accidents.

Protection systems which act in a preventive fashion even before a possible collision and use what is referred to as a pre-crash phase (i.e., a period of time starting from the detection of a high probability of a collision by appropriate detection systems in the vehicle up to the actual impact) to enhance the vehicle occupant protection by means of additional safety measures and thus lessen the severity of an accident, are referred to as preventive-action protection systems or so-called PRE-SAFE™ systems. In order to detect possible accident situations, preventive-action protection systems use information which from various sensor devices of the motor vehicle. The sensor devices here may also be a component of an electronic driving stability program or an inter-vehicle distance sensor system. Depending on the detected situation, conclusions are drawn about a possible accident, and appropriate measures, relating to restraint systems for vehicle occupants and possibly protection devices for other parties in an accident (such as pedestrians) are initiated in order to condition the vehicle for the imminent accident.

In such a method for actuating a reversible vehicle occupant protection means in a motor vehicle, as is disclosed, for example in German patent document DE 101 21 386 C1, the motor vehicle has a reversible vehicle occupant protection system which can be activated before a collision, and thus moved into an effective position. For this purpose, a sensor system is used to acquire driving state data which is monitored for any possible emergency braking, any possible oversteering and any possible understeering. If emergency braking, oversteering and/or understeering are detected, the vehicle occupant protection system is activated, and further conditions may be provided for the triggering operations. The sensor system for acquiring the driving state data may be a steering angle sensor, a pedal travel sensor, a brake pressure sensor, a wheel speed sensor, an acceleration sensor and a yaw rate sensor.

An emergency braking operation occurs if a braking process takes place with at least one feature which indicates a hazard situation or emergency situation. The state of emergency braking is determined by using at least one of the parameters of brake pressure, speed of the activation of the brake pedal and speed of the withdrawal of pressure from the accelerator pedal to evaluate the braking process. As an alternative to emergency braking which is brought about by the driver (driver reaction) it is possible to bring about emergency braking based on sensing of the surroundings.

As disclosed in German patent document DE 101 21 386 C1, the state of emergency braking can be detected by means of an intervention by a brake assistance system in the vehicle movement dynamics. For example, an information signal which is transmitted from the brake assistance system to a data bus may be used to detect the state of emergency braking. Triggering of the safety devices of the protection system is then coupled to the algorithm of the brake assistance system. The signal of the brake light switch which is also made available on the data bus of the vehicle can also be used to confirm (check the plausibility of) the detection of the state of emergency braking. With this redundancy in the detection of an emergency braking operation, the reliability of a decision when the protection system is triggered is increased.

A further preventive-action protection system is disclosed in German patent document DE 100 29 061 A1. In order to detect a state of emergency braking, the time gradient (that is time derivative) of the brake pressure which is generated by the brake pedal is evaluated. The fact that a threshold value is exceeded by the brake pressure gradient is indicative of an emergency braking state. The pedal travel or the pedal force can also be measured as a representative of the measured brake pressure. In order to check the plausibility of the decision, the brake pressure is also submitted to evaluation in parallel to the brake pressure gradient, by comparing the brake pressure with a brake pressure threshold value and comparing the time when the threshold was exceeded by the measured brake pressure with a predefined time period. This is intended to separate out brief braking situations in which the brake pressure gradient is above the brake pressure gradient threshold but the braking request is not present for long enough with an intensity above the threshold.

In addition according to German patent document DE 100 29 061 A1, the longitudinal deceleration (longitudinal braking measured value) of the vehicle and the state of an anti-lock braking system (ABS) may also be monitored in a separate decision channel with regard to the presence of an anti-wheel lock system. A potential accident situation is determined if the longitudinal deceleration exceeds a threshold value during a specific time period in the course of the brake slip control operation.

One object of the invention is to provide an improved method for a preventive-action protection system of the type specified in the introduction.

This and other objects and advantages are achieved by the methods according to the invention, which make it possible to react better to real driving states in that the triggering of the safety devices is also made dependent on the fact that the longitudinal deceleration of the vehicle which is caused by the braking intervention is not yet far advanced. In this method, triggering of the safety device is suppressed as soon as the braking intervention results in a perceptible longitudinal deceleration which, on the one hand, indicates that the vehicle is reacting sufficiently to a braking torque request by the driver (controlled braking) and on the other hand prevents pretensioning of a seatbelt (which is no longer appropriate) when the longitudinal deceleration and forward movement of the vehicle occupant have already occurred. At this time, the forward movement of the vehicle occupant would in fact have already advanced so far that it could no longer be reversed in sufficient time before the impact by the pretensioning.

The interrogation of the longitudinal deceleration permits triggering scenarios for an extended spectrum of driving situations which are critical in terms of longitudinal dynamics to be provided. It is also possible to assign such braking situations to the state of emergency braking which indicate a hazard situation or emergency situation but have until now not been sufficiently taken into account by the known methods: if the driver however depresses the brake pedal slowly but very strongly, a high degree of criticality also occurs if the vehicle does not react correspondingly to the braking torque request (panic braking), either because the brakes fail or because the tires are not adhering sufficiently to the underlying surface (that is, the coefficient of friction is low). This relates in particular to emergency-like braking processes on a slippery underlying surface (for example due to snow, ice, coverage with foliage) or in the case of aquaplaning. Such braking processes are not detected as critical by the known methods which link the detection of the state of emergency braking to the brake pedal activation speed, the gradient of the brake pressure or to the braking assistant.

In one advantageous embodiment of the invention, a state of emergency braking is determined if the braking torque request exceeds a request threshold. However, safety devices are activated only if at the same time the longitudinal deceleration of the vehicle does not exceed a threshold.

In addition or as an alternative, the braking torque request speed is observed with respect to the exceeding of a threshold, in order to detect the requesting of an emergency braking operation. In one advantageous embodiment this threshold can be controlled as a function of the brake pressure request. Since the request speed threshold decreases as the braking request increases, sudden activation of the brake pedal subsequent to a normal braking operation can be detected as an emergency braking operation even though the available activation travel is reduced.

The thresholds for the braking torque request or the braking torque request speed can be influenced by the driving state data. In particular, at low driving speeds (below approximately 30 km/h) the thresholds can be raised so that incorrect triggerings or undesired triggering in this speed range can be effectively suppressed. At speeds above approximately 80 km/h, the thresholds can be lowered because at higher speeds the driver has been empirically found to depress the brake more sensitively. It is also conceivable to influence the threshold as a function of the transverse acceleration. In particular, the thresholds could be lowered in a central transverse acceleration range.

In many cases, the signal for the braking request speed is formed by deriving the braking request signal over time. As is explained below, it may, however, be advantageous for the formation of the braking request speed and braking request signal to make use of different measurement variables which represent the braking torque request of the driver.

Basically, the brake pressure in the master brake cylinder can be used as an underlying measurement variable to acquire the braking torque request and to detect an emergency braking request by the driver. However, the brake pressure in the master brake cylinder reacts very slowly to a sudden braking torque request by the driver and is therefore less suitable for sensing rapid changes in the driver's requests.

In a conventional hydraulic system, a diaphragm travel sensor senses both the pedal movement and the diaphragm movement of the brake booster. The diaphragm travel sensor thus reacts much more directly to the pedal travel than the brake pressure in the master brake cylinder. In an electrohydraulic brake system (brake-by-wire system) a pedal travel sensor picks up the activation of the brake pedal directly. If a diaphragm travel sensor or pedal travel sensor is present, it is therefore alternatively or additionally also possible to use such sensor to sense the braking torque request.

According to one advantageous refinement of the invention, the signal of a pedal travel or diaphragm travel sensor is used to obtain the braking torque request speed from the derivative of the signal over time. Using these measurement variables has the advantage that the pedal travel initially represents the driver's request without disruption and directly, because of a delayed reaction of the back pressure in the brake system on the activation of the brake, the pedal does not yet have to be depressed against a high resistance. A reaction of the brake system against the pedal force does not occur until later in the course of the activation. The signal of a pedal travel sensor or diaphragm travel sensor is also possibly unusable during an ABS controlled intervention due to the pulsating reaction on the brake pedal. In particular, pedal travel measurement or diaphragm travel measurement is therefore suitable for early sensing of a rapid braking torque request by the driver.

However, the pressure in the master brake cylinder is a highly suitable variable for evaluating a slow and enduring braking torque request because said pressure follows the activation of the brake pedal with a certain degree of inertia. As a result many brief braking situations can already be separated out because a sufficient brake pressure is not generated.

Accordingly, an advantageous combination is one in which the evaluation of slow and enduring braking torque requests is supported on the brake pressure in the master brake pressure cylinder, while the braking torque request speed is acquired from the time derivative of a signal of the pedal travel sensor or diaphragm travel sensor.

If there is a reproducible relationship between the pedal travel and a pedal restoring force, a pedal force sensor can be used instead of a pedal travel sensor. However, if the restoring force of the brake pedal is due to a reaction of the backpressure in the brake system, the relationship is no longer unambiguous. In this case, the pedal force corresponds more to the brake pressure in the master brake cylinder.

In addition to the known safety devices which can be triggered in a preventive fashion, such as the reversible seat belt pretensioner of a seat belt, there are a series of further vehicle occupant protection means which can be actuated and which produce a restraining effect or an energy-absorbing effect in order to protect a vehicle occupant in the event of a collision. Examples of such vehicle occupant protection means are movable impact elements, cushions and headrests whose size, hardness, shape and position can be changed by means of an actuation process. In addition to these vehicle occupant protection means, further safety devices which can be actuated can be provided for reducing the severity of an accident. Such safety devices reduce the consequences of an accident for a vehicle occupant by actuating electrically adjustable assemblies, for example an electric seat adjustment device or an electric adjustment device for vehicle openings (window lifter, sunroof closing system) or door locks, which were originally provided for comfort purposes.

In order to diminish the consequences of accidents, it is also possible to provide safety devices which can be actuated in motor vehicles and which also serve to protect other parties in a collision, in particular pedestrians and cyclists. Examples include adjustable engine hoods, movable bumpers and impact elements with adjustable hardness on the outer skin of the vehicle. Further protection means which can be actuated are the ride level controller and the braking and steering system by which an impact can be optimized in the direction of less severe injury to the vehicle occupants and/or the parties in a collision. These protection means are also to be understood below as safety devices within the sense of the present invention.

Other objects, advantages and novel features of the present invention will become apparent from the following detailed description of the invention when considered in conjunction with the accompanying drawings.

BRIEF DESCRIPTION OF THE DRAWINGS

The single FIGURE shows by way of example a block circuit diagram of a preventive-action protection system in a motor vehicle for carrying out an advantageous embodiment of the method according to the invention.

DETAILED DESCRIPTION OF THE DRAWINGS

In order to actuate the preferably reversible safety devices 1, the driving state data which has been picked up by means of the driving state sensor system 2 (in particular a braking torque request acquisition means 2.1 and a longitudinal acceleration acquisition means 2.2) are monitored with respect to a braking torque request B which is predefined by the driver and the longitudinal acceleration a_x of the vehicle.

The longitudinal acceleration a_x of the vehicle can be measured directly by means of a longitudinal acceleration sensor, which can also be used for other purposes for detecting a gradient in the stationary state. The longitudinal acceleration a_x of the vehicle can also be calculated from wheel speeds and/or by means of a dynamic vehicle model in which the longitudinal acceleration of the vehicle is determined from the engine torque and/or transmission torque. The threshold for the longitudinal deceleration is of the order of magnitude of 0.3 g. This is also the order of magnitude at which legally prescribed locking of the seatbelt occurs. However, the threshold for the longitudinal deceleration can also be made higher because tensioning is still possible even when a seatbelt is locked.

In a braking request evaluation means 3, a possibly requested emergency braking operation NB is determined from the braking torque request B. The driving state data is monitored in parallel in a longitudinal deceleration evaluation means 4 in order to determine whether the longitudinal deceleration, which corresponds in absolute value to the longitudinal acceleration, is less than(does not exceed) a longitudinal deceleration threshold S_LV.

In a criticality evaluation means 5 for the longitudinal dynamics, the signals from the braking request evaluation means 3 and the longitudinal deceleration evaluation means 4 are combined. In a simple embodiment, a logic signal for a requested emergency braking operation NB and a logic signal for the undershooting of the longitudinal deceleration threshold S_LV are logically combined with one another in an AND logic operation (AND). The criticality evaluation means 5 outputs a logic signal (bit information) for critical longitudinal dynamics LD=1 if both an emergency braking operation is requested, i.e., NB=1, and the longitudinal deceleration is less than the limiting value S_LV. If an emergency braking operation is not occurring (i.e., NB=0), or if the threshold for the longitudinal deceleration is exceeded, the criticality evaluation means outputs a logic signal LD=0.

The logic signal LD of the criticality evaluation means 5 actuates the safety device 1 in such a way that, when critical longitudinal dynamics are present, (indicated by a logic state LD=1), at least one of the safety devices 1 (in particular, a reversible seatbelt pretensioner) is activated.

A plurality of embodiments are conceivable for the braking evaluation means 5 which can determine a requested emergency braking operation from a braking torque request B which is predefined by the driver.

In a first embodiment, the braking torque request speed is calculated in an evaluation means 3.1 from the braking torque request B which is requested by means of the brake pedal from the time derivative dB/dt. The braking torque request speed is compared in an interrogation means 3.2 with a threshold S_AG for the speed of the braking torque request, and if the threshold is exceeded an emergency braking operation is determined. This ensures that if the driver depresses the brake pedal quickly, due to the high gradient (time derivative) a high criticality (emergency braking) is determined in the braking torque request B and a safety device 1 is triggered.

According to the invention, triggering of the safety device 1 is suppressed if it is apparent from the longitudinal deceleration evaluation means 4 that a longitudinal deceleration above the threshold is already present. This has the advantage that if forward movement of the vehicle occupants caused by an incipient braking process is occurring, a reversible seatbelt pretensioner is not activated because the pretensioner can no longer have its full effect. For the typical case of a sudden emergency braking operation (i.e., one which occurs without pre-braking) the preventive safety devices, in particular the seatbelt pretensioner, are activated in a way known from the prior art.

In one embodiment of the invention, the threshold S_AG for the braking torque request speed dB/dt can be lowered as a function of the braking torque request B. The system can thus be made more sensitive in order to be able to trigger the measures which are provided for the emergency braking for a situation in which the brake is subsequently depressed quickly, even if a normal braking operation has already been requested and longitudinal deceleration has not yet occurred. This is advantageous, for example, if the brake pedal is first activated in a normal way on a slippery road but when the deceleration effect fails to occur (owing to the low coefficient of friction) the driver subsequently rapidly depresses the brake pedal in order to request an emergency braking operation. Making the triggering threshold more sensitive by means of the signal of the braking torque request B already lowers the threshold S_AG in the interrogation means 3.2 if the driver rapidly activates the brake pedal so that an emergency braking operation is determined. Without the lowering, an emergency braking situation would not be detected because the activation of the brake over the remaining pedal travel could no longer lead to a sufficiently fast activation speed to exceed the threshold S_AG.

In an alternative or supplementary embodiment, the braking torque request B is evaluated in the braking request evaluation means 3 directly by comparing it with a threshold S_A in an interrogation means 3.3. With this triggering channel, braking operations in which the driver depresses the brake pedal slowly but increasingly strongly (panic braking) is also detected as an emergency braking situation with a high level of criticality, which can lead to the triggering of safety devices 1 for an emergency braking operation if sufficient longitudinal deceleration has not yet occurred. As a result, panic braking operations which are initiated slowly on a slippery road and during which the driver depressed the brake pedal further and further in order to bring about a deceleration effect (which does not occur owing to the low coefficient of friction) can be taken into account. If a vehicle is moving toward an obstacle on a slippery road and is unable to comply with the strong braking request by the driver, an emergency situation is detected which leads to triggering of the safety measures provided for an emergency braking operation. On the other hand, the interrogation means 4 prevents the triggering of safety measures after longitudinal deceleration whenever severe braking is carried out under normal road conditions and the braking effect actually also occurs.

In one embodiment in which both the braking torque request B and its time derivative dB/dt or the braking torque request speed are used, the results of the threshold interrogations 3.2, 3.3 can be combined in an OR logical operation 3.4. An emergency braking signal NB is output if a critical emergency braking request is detected on one of the two evaluation channels.

It is also possible to activate a first group of safety devices 1, including the reversible seatbelt pretensioner, in the way described if a signal LD for critical longitudinal dynamics is present, while other safety devices of a second group are already activated if an emergency braking operation is detected without the longitudinal deceleration of the vehicle being significant. These are in particular safety devices whose protective effect is not adversely affected by a forward movement of an occupant. It is also possible in this context to provide a subgroup of safety devices within this second group, said subgroup being triggered if a high braking torque request is present without a high braking torque request speed or low longitudinal deceleration being significant. These are safety devices which are already intended to go into the effective position when normal but strong braking interventions occur. Safety devices which must be triggered early in order to go into the effective position, such as for example the backrest uprighting device or the closing of vehicle openings or an active headrest, would be suitable.

The extended logic provides room for maneuver for expanded triggering scenarios in the case of driving situations which are critical in terms of longitudinal dynamics. If the driver depresses the brake pedal quickly, a high gradient of the braking torque request B occurs and an emergency braking operation is detected. If the driver subsequently depresses the brake pedal quickly in the (slightly) braked state (<0.3 g), an increased gradient of the braking torque request B results and is likewise evaluated as an emergency braking situation (emergency braking operation with subsequent depression of brake pedal) due to the lowered threshold. If the driver depresses the brake pedal slowly but very strongly (panic braking), a high degree of criticality and an emergency braking operation are also detected if no longitudinal deceleration is present.

If a critical situation has been passed through without an accident and the braking torque request is rescinded, the value drops below the thresholds S_AG and S_A again. A hysteresis may be provided by virtue of the fact that the emergency braking signal NB and thus the reversible safety devices are not reset until the values drop below thresholds which are selected below the thresholds S_AG and S_A.

Instead of performing logic operations on the results of the different evaluations or interrogations, it is possible to achieve a comparable response of the protection system by replacing the binary logic in a manner known per se by a fuzzy logic. For example, an overall criticality level for the longitudinal dynamics which is dependent on the vehicle data in a multifactorial way and which assumes a value between 0 . . . 1 and has to overcome a fixed threshold at, for example, 0.8 for a safety device to be triggered can be formed.

In the exemplary embodiment, a value of 0.3 g has been given as a threshold for the longitudinal deceleration. This is to be understood only as an approximate guide value. In practice a value between 0.3 g and 0.5 g has proven appropriate.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of operating a preventive-action protection system in a motor vehicle having safety devices for diminishing the consequences of accidents, said method comprising:
   a driving state sensor system acquiring driving state data;
   monitoring said driving state data with respect to the longitudinal deceleration of the vehicle and a braking torque request by the driver;
   a braking request evaluation means determining a state of emergency braking from the braking torque request;
   triggering at least one of the safety devices if a state of emergency braking is present and at least one further condition is met;
   wherein in order to meet the further condition in a longitudinal deceleration evaluation means, the longitudinal deceleration must not exceed a longitudinal deceleration threshold (S_LV).

2. The method as claimed in claim 1, wherein if the braking torque request exceeds a request threshold, a state of emergency braking is determined.

3. The method as claimed in claim 1, wherein a braking torque request speed is acquired, and if it exceeds a request speed threshold, a state of emergency braking is determined.

4. The method as claimed in claim 3, wherein the request speed threshold decreases as the braking torque request increases.

5. The method as claimed in claim 3, wherein:
   Determination of the braking torque request is based on a measurement of pressure in a master brake cylinder of a brake system of the vehicle; and
   the braking torque request speed is determined from the time derivative of one of brake pedal travel and diaphragm travel of a brake booster.

6. The method as claimed in claim 5, wherein brake pedal travel is measured by one of a pedal travel sensor and a diaphragm travel sensor.

7. The method as claimed in claim 1, wherein at least one of the request threshold and the request speed threshold is dependent on at least one of speed and transverse acceleration of the vehicle.

8. The method as claimed in claim 1, wherein the braking torque request is derived from the brake pressure and the braking torque request speed from the derivative of the brake pressure over time.

9. The method as claimed in claim 1, wherein the longitudinal deceleration threshold (S_LV) has a value between approximately 0.3 g and approximately 0.5 g.

* * * * *